United States Patent Office 2,855,065
Patented Oct. 7, 1958

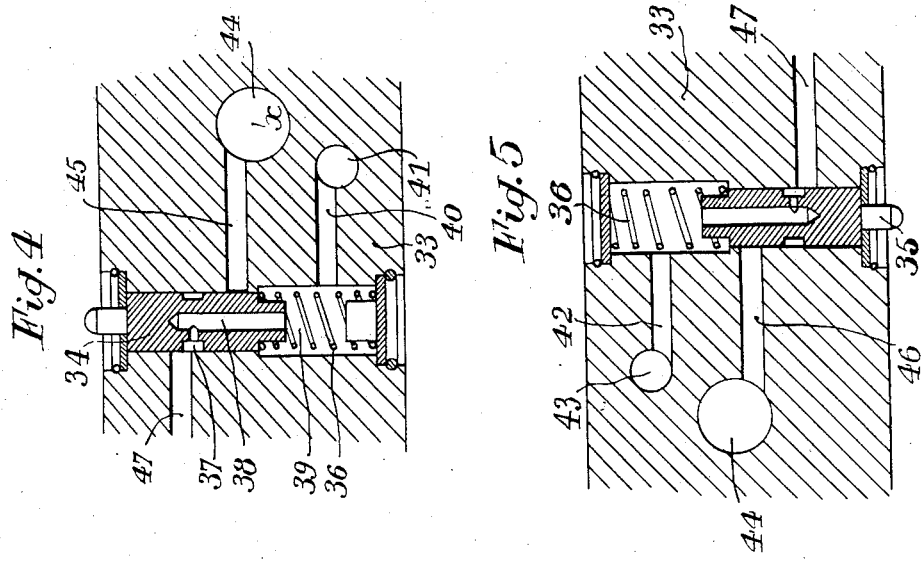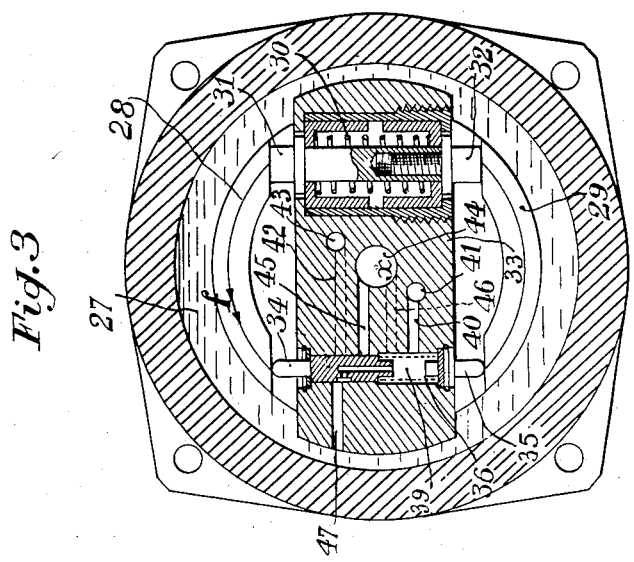

2,855,065

HYDRAULIC SERVO-CONTROL SYSTEM ESPECIALLY APPLICABLE TO THE STEERING OF AUTOMOBILE VEHICLES AND THE LIKE

René Lucien, Paris, France, assignor to Societe d'Inventions Aeronautiques et Mecaniques, S. I. A. M., Fribourg, Switzerland, a corporation of Switzerland Application May 26, 1954, Serial No. 432,579

Claims priority, application France March 19, 1954

4 Claims. (Cl. 180—79.2)

This invention relates to servo-control systems.

The present invention has as an object the provision of a servo-control system which is especially applicable to the steering of automobile vehicles and the like. In these applications, the system enables the effort required from the driver to be reduced as soon as this effort exceeds a certain value, while at the same time he still retains the physical sensation of control. In other words, in this system, the effect of the servo-control is constantly accompanied by a certain proportionality between the effort applied to the steering control of the wheels on the one hand and, on the other hand, the effort exerted by the driver in effecting this control.

In the most general aspect of its principle, a system provided in accordance with the invention is characterised in that in a kinematic chain which connects the control member to the system of rods which control the wheels, and on this rod system itself, there are respectively mounted a hydraulic transmitter-distributor and a jack. The transmitter-distributor is capable by its structure of mechanically transmitting the control effort to the wheels so long as that effort does not exceed a pre-determined value, and, alternatively, as soon as this value is exceeded, of interrupting this mechanical transmission and of putting automatically into service the jack which effects the servo-control, while however producing at the same time in the control member, a reaction proportional to the pressure existing inside the jack and thus proportional to the effort applied to the wheels at each instant.

The transmitter-distributor is characterised by the combination of the following members:

(1) Two shafts, the primary and secondary shafts, aligned on the same axis and which are respectively rigidly coupled for rotation with the steering wheel or its equivalent, and of the globoid worm screw, pinion or the like, controlling the direction of the wheels.

(2) Two members, such as jaws, carried by the primary shaft and acting on a pair of eccentrically mounted push rods, mechanically operated and provided with springs, the rods being mounted in the secondary shaft and acting to transmit to the latter the angular displacements of the primary shaft, either in one direction or in the other, the strength of the spring or springs and the eccentricity of the push rods with respect to the axis being chosen so as to correspond to a limiting value of the resisting force, up to which value the primary shaft effects directly the rotation of the secondary shaft, and beyond which also the primary shaft carries out a movement with respect to the secondary shaft, the relative movement being adapted to cause the setting in operation of the jack mounted on the system of rods and, in consequence, the initiation of the servo-control.

(3) In order to effect the operation of the jack, a second pair of push rods, which are hydraulically actuated and are also fixed in the secondary shaft and which, under the control of the said relative movement, put into communication through suitable conduits and bored holes, the supply of liquid under pressure with either the one or the other of the chambers of the jack depending on the direction of the said relative movement. These push rods act, furthermore, in the same way as relief valves so as to transfer back towards the control member a reaction proportional to the effort applied to the wheels by the jack.

(4) A permanent communication set up between each of the chambers of the jack on the one hand, and the general return line of the hydraulic system on the other, during the periods in which the secondary shaft is directly and mechanically driven by the primary shaft, that is to say when the hydraulic push rods are not actuated.

In a simplified form of the invention, each mechanical push-rod is combined in a single member with the corresponding hydraulic push-rod.

The preferred embodiment of the invention is illustrated in the attached drawings, in which:

Fig. 3 is a view in transverse cross-section of the transmitter-distributor showing at its right-hand side, the mechanical push-rods and, at its left-hand side the hydraulic push-rods.

Figs. 4 and 5 show in cross-section and to a larger scale, the details of the hydraulic push-rods.

Figure 1:
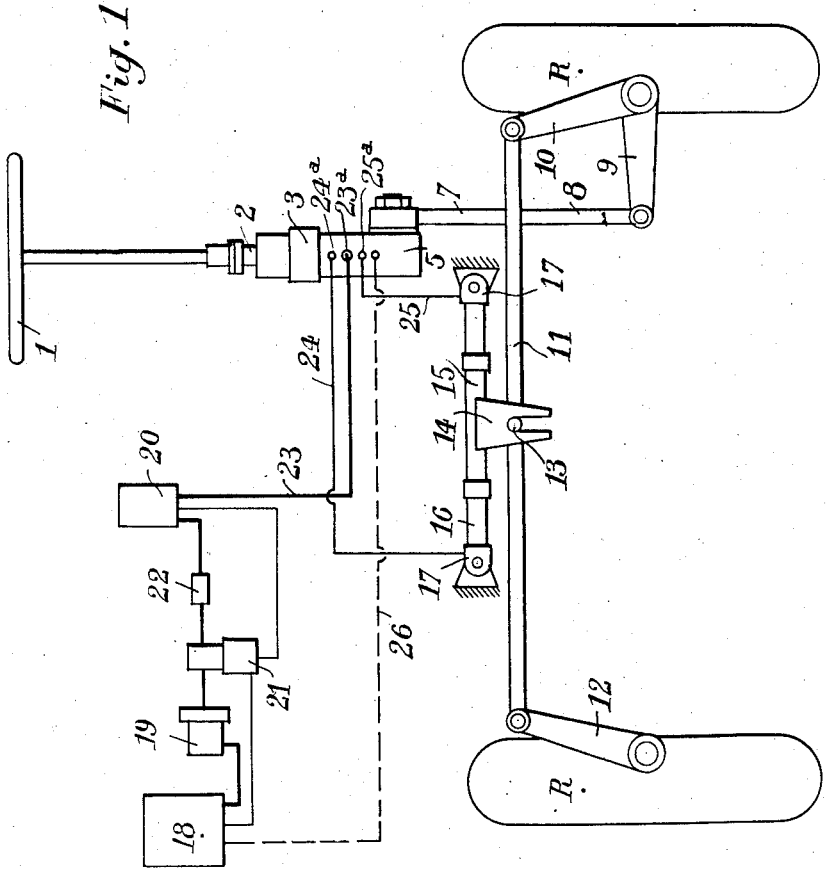
Fig. 1 is a diagrammatic view of the whole of the servo-control system.
Figure 2:
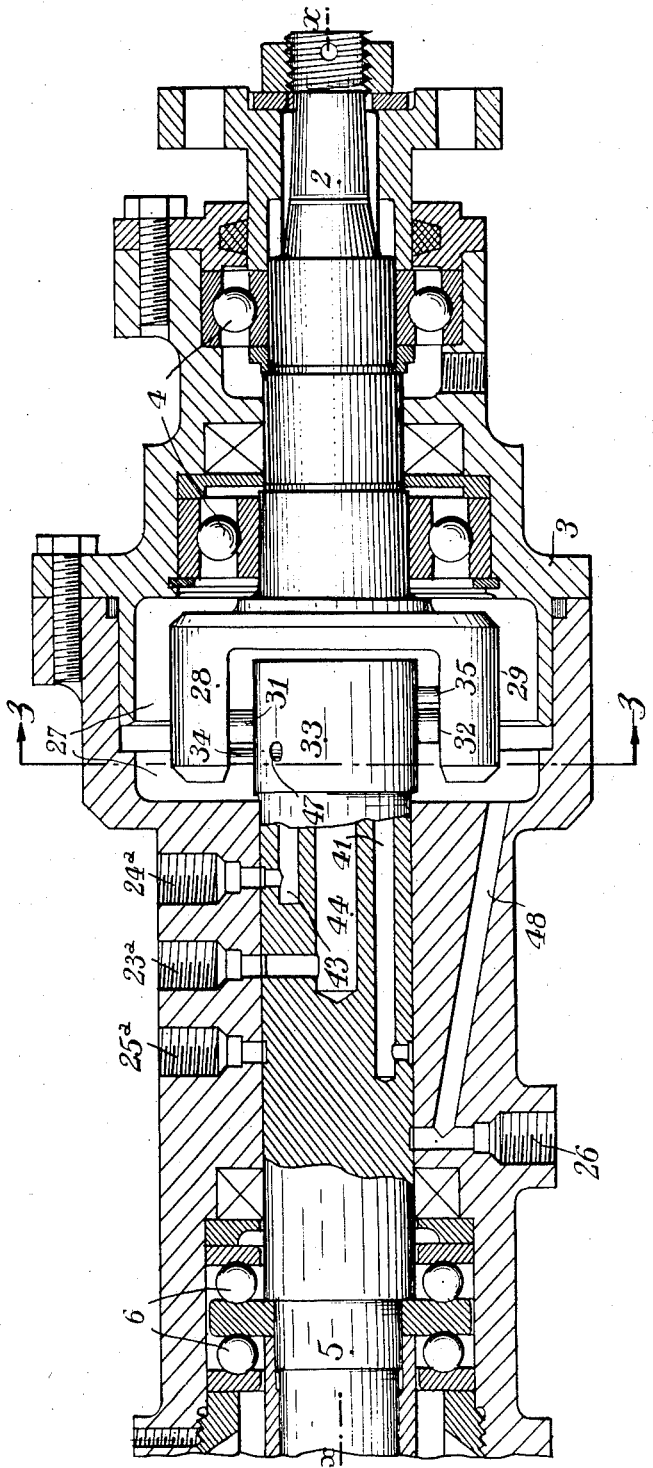
Fig. 2 is a view in axial longitudinal cross-section of the transmitter-distributor.

Referring now to the drawings:

The steering wheel 1 is shown coupled for rotation to the primary shaft 2, which passes into the casing of the transmitter-distributor 3 through ball bearings 4—4 (Fig. 2).

The secondary shaft 5 is shown coaxial with the shaft 2 and is free to rotate in bearings 6—6 mounted in the said casing. The shaft 5 drives, through the medium of a globoid worm screw, a pinion, or the like, the connecting-rod 7 which actuates the usual link-rod system 8, 9, 10, 11 and 12 which controls the wheels R.

On a finger 13 fixed to the member 11 is engaged a fork-shaped member 14 (in this case rigidly coupled to the cylinder 15) of a jack, the shaft 16 of which is terminated by cheeks 17—17 built into the framework of the vehicle.

The source of fluid under pressure is of standard type and comprises a reservoir 18, from which the fluid is drawn by a pump 19 which delivers into a buffer-accumulator 20, through a by-pass 21 and a non-return valve 22. This accumulator supplies the transmitter-distributor 3 through a pipe 23. The transmitter-distributor, in its turn, supplies the two respective chambers of the jack 15 through the working conduits 24—25.

A general return circuit 26 connects the internal chamber 27 (Fig. 2) of the transmitter-distributor to the reservoir 18.

The internal construction of the transmitter-distributor—which constitutes in itself one of the essential features of the invention—will now be described in detail with reference to Figs. 2 and 3.

To the primary shaft 2 are rigidly coupled two jaws 28, 29, shown here as diametrically opposite to each other and having flat portions against which two push-rods 31 and 32 respectively, are fitted, the push-rods being mechanically operated and mounted eccentrically with respect to the general axis x—x in a block 33 fixed to the internal extremity of the secondary shaft 5. In the example shown, these push-rods are integrally connected, and a prestressed spring 30 yieldably resists their longitudinal displacement in either direction.

In this same block 33, are also mounted two further push-rods 34, 35, the latter being hydraulically actuated and also mounted eccentrically with respect to the axis x—x. In addition, in the example shown, these push-rods are displaced along this axis with respect to each other.

These push-rods are continually forced against further flat surfaces provided in the jaws 28, 29, by means of springs 36.

The construction of these hydraulically-actuated push-rods being identical, the description will be limited to that of the push-rod 34 (see Fig. 4). At its periphery, it is provided with a groove 27 which communicates with an axial internal channel 38 which opens into a chamber 39 connected by the drilled holes 40 and 41 with the connector 25a (Fig. 2) of the working circuit 25.

In the same way, the chamber of the push-rod 35 is connected by drilled holes 42 and 43 (Fig. 5) to the connector 24a of the other work circuit 24.

With regard to the connector 23a of the supply circuit 23, this is connected to an axially bored passage 44, into which open two passages 45 and 46, the latter communicating respectively at their other ends with the slide-chambers of the push-rods 34, 35.

The operation of the transmitter-distributor is effected as follows:

As long as the resistance force which opposes any angular displacement of the secondary shaft 5 does not exceed a certain limiting value, determined by the pre-stress of the spring 30, rotation in either one direction or the other imparted by the driver to the primary shaft, is directly transmitted to the secondary shaft by the pair of mechanical push-rods 31 and 32.

If this resistance force acting on the secondary shaft is in excess of the limiting value, the spring 30 is compressed and the jaws 28 and 29 are given a relative movement with respect to the secondary shaft and to the block 33 which is mounted on this shaft. If, for example, this relative movement is in the direction f (Fig. 3), the hydraulic push-rod 34 is forced down and compresses its spring 36, which brings the groove 37 in line with the passage 45, so that through the passage 38 and the chamber 39, the supply pressure which arrives through the central passage 44 is applied, through 40, 41 and the work circuit 25, towards one of the chambers of the jack 15, thereby controlling the lateral movement of the latter and the corresponding movement of the wheels.

If, on the other hand, the relative movement takes place in a direction opposite to that of f, the other hydraulic push-rod 35 is forced down and causes the supply pressure to be applied to the other chamber of the jack through the distribution system 46, 42 and 43 and the work circuit 24.

It is important to note that the push-rods 34 and 35 do not behave like simple slide-valves but act like relief valves. In fact, as soon as they have been forced down and have established a communication between the supply of liquid under pressure and the chambers which lie beneath them, these push-rods are subjected to the pressure obtaining in the chamber in question and, due to this fact, they react against the jaw which has forced them down. By virtue of this reaction, and as has already been stated at the beginning of this description, there constantly exists during the operation of the servo-control, a proportionality between the force applied by the jack to the control of the wheels and the physical effort required from the driver, so that the latter may retain the muscular sensation of the steering control.

It is clearly necessary that during periods of direct control, that is to say when the two hydraulic push-rods are extended outwards, the work circuits 24 and 25 shall be in communication with the general return line 26 to the reservoir 18. This condition is effected by means of drilled passages 47 which, in the position of rest of the push-rods, establish a communication, through the peripheral groove 37, the passage 38 and the chamber 39, or their corresponding members, with the work circuits 24 and 25 and the internal chamber 27 of the distributor, the latter being itself connected through a drilled passage 48 to the general return line 26 connected to the reservoir. By this means, when the steering control only requires a small muscular effort, the movement is carried out by direct control without any interference due to the presence of the jack. In the same way, in the event of a failure of the hydraulic supply system, the direct control can continue to be employed with perfect safety.

It will be understood that rotary joints constituted by grooves as shown in Fig. 2, are provided so as to ensure the passage of the liquid under pressure without any leakage between the passages 44, 43 and 41, and the corresponding connectors 23a, 24a and 25a.

Figure 6:
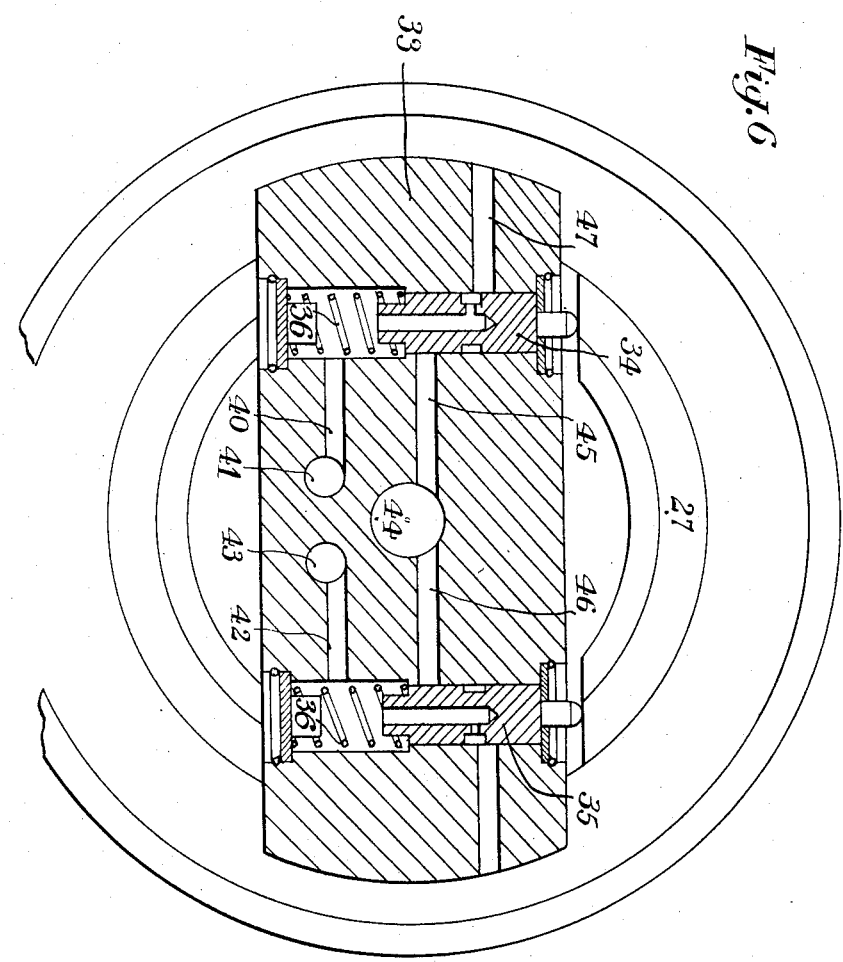
Fig. 6 shows diagrammatically the simplified form of construction of the push-rod assembly.

In Fig. 6, which shows a simplified form of the invention, the hydraulic push-rods 34 and 35, carry out additionally the function which was previously allotted to the mechanical push-rods 31 and 32, by suitably choosing the strength and the pre-stressing of their springs and a strictly equal calibration of the latter, which then divide between themselves the function of the spring 30 of Fig. 3 in forcing the push-rods against the respective flat surfaces of the jaws.

What I claim is:

1. In a steering system for an automotive vehicle, a steering wheel, a linkage system connected to the steerable wheels of the vehicle for transmitting thereto the steering movements of the steering wheel, a hydraulic power system comprising a pump, a reservoir, an accumulator and means for controlling the pressure in the accumulator, a double-acting hydraulic jack connected to the linkage system, a system of valves controlled alternately by the steering wheel, the valves being connected to the accumulator, to the reservoir and each to respective ends of the hydraulic jack and operative, in neutral position, to interrupt communication between the accumulator and jack and to establish communication between the jack and reservoir and, in active position, to establish communication between the accumulator and respective ends of the jack and to interrupt communication between the jack and reservoir, a primary shaft directly connected to the steering wheel, a secondary shaft aligned with the primary shaft and mechanically connected to the linkage system, resilient engaging means between the two shafts for transmitting from the primary shaft to the secondary shaft in either direction of rotation a force less than a predetermined value and for permitting relative rotation of the two shafts when said value is exceeded, a valve block rigidly connected to one shaft and comprising two valves included in said valve system, two jaws rigidly connected to the other shaft, each contacting, in neutral position, one of the valves and operative to actuate one of the valves upon relative rotation of the shafts depending on the direction of said rotation, a pair of spaced bearings for the adjacent ends of the two shafts, a casing spanning the space between and closed at its ends by the two bearings, the jaws being located inside the casing and mounted symmetrically on the primary shaft, and the valve block being also located inside the casing and mounted on the secondary shaft, a return spring urging each valve into contact with the associated jaw, an axial pressure channel in the valve block and the secondary shaft and extending through the bearing of the secondary shaft to the accumulator, longitudinal channels in the valve block and the secondary shaft connected respectively to one of the valves and to one end of the jack, discharge channels extending transversely in the valve block connecting each valve to the inside of the casing, and a return channel in the casing wall connecting the inside thereof through a return line to the reservoir, each valve being operative, in neutral position, to interrupt communication therethrough with the axial pressure channel and to establish communication between the longitudinal and discharge channels connected thereto and, in active position, to interrupt communication therethrough with the longitudinal channel connected thereto and establish communication between the axial pressure channel and one end of the jack.

2. A steering system as in claim 1 wherein the return springs urging the valves into contact with the jaws are calibrated to yield to the exertion on the primary shaft of a manual force in excess of said predetermined value.

3. In a steering system as in claim 1, said resilient engaging means comprising a pair of interconnected push rods in the valve block positioned eccentrically thereof and contacting the two jaws, and a prestressed spring opposing longitudinal movement of the push rods in either direction whereby a yielding resistance of predetermined value is exerted against a force manually applied to the primary shaft.

4. In a steering system for a vehicle having a steering wheel and steerable wheels actuatable by a linkage system: a steering shaft means including a primary shaft and a secondary shaft respectively coupled to said steering wheel and said linkage system, and means coupling said primary and secondary shafts to provide a limited direct drive between said shafts for the operation of the linkage system under the direct control of the steering wheel; said means comprising a resilient device coupling said shafts and preventing a relative rotational displacement of said shafts up to a determinable resistance to rotation of the secondary shaft resulting from resistance to a turning of said steerable wheels, a first valve element supported on one of said shafts, a source of pressure medium coupled to said valve for the supply of pressure medium thereto, a jack coupled to said valve for being operated thereby and also being coupled to said linkage system for actuating the same, and a second valve element operatively associated with said first valve element and supported therein independently of said resilient device, said second valve element being responsive to a relative rotation between the shafts for enabling said valve to couple said source to said jack whereby said jack controls the linkage system only upon a determinable resistance to a turning of the steerable wheels.

References Cited in the file of this patent

UNITED STATES PATENTS

| | | |
|---|---|---|
| 1,777,109 | Stokes et al. | Sept. 30, 1930 |
| 1,981,591 | Edmondson | Nov. 20, 1934 |
| 2,028,451 | Hodge et al. | Jan. 21, 1936 |
| 2,037,505 | Eaton | Apr. 14, 1936 |
| 2,252,660 | Kulikoff | Aug. 12, 1941 |
| 2,650,669 | Hammond | Sept. 1, 1953 |
| 2,682,929 | Almond | July 6, 1954 |
| 2,685,342 | Lauck | Aug. 3, 1954 |